United States Patent [19]

Esaki

[11] Patent Number: 4,970,720
[45] Date of Patent: Nov. 13, 1990

[54] PACKET COMMUNICATION EXCHANGE INCLUDING DUMMY PACKET TRANSMISSION

[75] Inventor: Hiroshi Esaki, Yokohama, Japan

[73] Assignee: Kabushiki Kaisha Toshiba, Kawasaki, Japan

[21] Appl. No.: 324,725

[22] Filed: Mar. 17, 1989

[30] Foreign Application Priority Data

Mar. 17, 1988 [JP] Japan .................................. 63-61868
Jun. 30, 1988 [JP] Japan ................................. 63-160871

[51] Int. Cl.[5] .............................................. H04J 3/22
[52] U.S. Cl. ............................ 370/85.200; 370/94.100
[58] Field of Search .................. 370/60, 61, 85.2, 94.1

[56] References Cited

U.S. PATENT DOCUMENTS 4,594,706 6/1986 Kobayashi .......................... 370/94.1
4,727,537 2/1988 Nichols .............................. 370/85.2

Primary Examiner—Douglas W. Olms
Assistant Examiner—Melvin Marcelo
Attorney, Agent, or Firm—Foley & Lardner, Schwartz, Jeffery, Schwaab, Mack, Blumenthal & Evans

[57] ABSTRACT

A packet communication exchanging apparatus includes: a common communication channel through which a plurality of data packets are communicated; a plurality of input modules coupled to the common communication channel, for receiving the data packets and transferring the data packets to the communication channel; and, a plurality of output modules coupled to the common communication channel, for temporarily storing the data packets sent from the input modules via the communication channel, and for generating and sending a dummy packet to the communication channel when the amount of the data packets temporarily stored therein exceeds a predetermined threshold value, whereby the input module detects a packet contention occurring on the communication channel due to the dummy packet supplied thereto so as to control the data packet transmission from the input module to the communication channel.

32 Claims, 10 Drawing Sheets

PACKET COMMUNICATION EXCHANGE INCLUDING DUMMY PACKET TRANSMISSION

BACKGROUND OF THE INVENTION

1. Field of the Invention

The present invention generally relates to a load controlling system used in a packet communication exchange. More specifically, the invention is directed to a load controlling method employed in packet communication exchange, capable of accessing a data bus with high efficiency.

2. Description of the Related Art

In a known packet transmission exchange, data packets are transmitted and/or received between a plurality of modules connected to a common communication medium, for instance, a data bus. When a data packet transmission demand for the common communication medium causes contention disputes, contention control is carried out so as to apply a transmission right to a specific module among those modules where the packet contention disputes occur. Also, another packet contention controlling method has been proposed, in consideration of an equality, where such a transmission right is not applied eccentrically to a specific module.

The above-described conventional contention controls of the packet communication system are known from, e.g., Japanese Laid-open (KOKAI) patent application No. 59-200554 (1984) corresponding to U.S. Pat. application Ser. No. 485034 filed on Apr. 13, 1984 the U.S.A. by Anthony Acampora, entitled "Network Protocol For Integrating Synchronous and Asynchronous Traffic On A Common Serial Data Bus."

In accordance with these conventional packet contention controlling systems, the packet transmission delays occurring between the modules employed in the packet communication exchange can be controlled. However, another packet transmission delay occurring in the buffer circuit employed in the module is rather more serious than the above-described delays caused in the modules, because of the major reason for the delay. This buffer circuit is used for packets waiting for packet transmission to the trunk line. This packet transmission delay in the buffer circuit is particularly emphasized in such a case as when the packets are temporarily concentrated in the module corresponding to the specific trunk line, which are sent from the communication medium in the pocket communication exchange capable of possessing the extremely higher throughput than the data transmission speed in the trunk line. This delay tendency is increased even more when the traffic owns the burst characteristics. In the specific condition, the data packets to be sent may overflow the buffer circuit. As a consequence, the packets which have overflowed the buffer circuit may be discarded during pocket communication.

As previously described, the above-described conventional bus accessing type packet communication exchanges have the following drawbacks. That is, due to the mis-matching in the operation speeds, the amount of the data packets to be transmitted, the operation speed of which is lower than the bus operation speed, temporarily becomes excessive. As a result, these waiting data packets temporarily stored in the buffer circuit may overflow this buffer circuit and thus, the overflowed packets may be discarded during packet communication.

The present invention has been made in an attempt to solve these problems of the conventional packet communication systems, and therefore has an object to provide a load controlling system used in a packet communication exchange, capable of controlling packets which are waiting to be transmitted to a common communication medium without discarding the data packets.

SUMMARY OF THE INVENTION

To achieve the above-described object, a load controlling system used in a packet communication exchange, according to the invention, comprises:

a common communication channel (6) through which a plurality of data packets are communicated;

a plurality of input module means (401-1: 401-N, "N" being an integer) coupled to the common communication channel (6), for receiving the data packets and transferring the data packets to the communication channel (6); and, a plurality of output module means (402-1: 402-M, "M" being an integer) coupled to the common communication channel (6), for temporarily storing the data packets sent from the input module means via the communication channel (6), and for generating and sending a dummy packet to the communication channel (6) when an amount of the data packets temporarily stored therein exceeds over a predetermined threshold value (A : B), whereby the input module means detects a packet contention occurring on the communication channel due to the dummy packet supply thereto so as to control the data packet transmission from the input module means to the communication channel.

In the load controlling system used in the pocket communication exchange, according to the invention, the packet transmission and reception by the terminal interface module are controlled by the control unit in accordance with the capacity of the memory employed in the trunk interface module. Then, the probability of excessive packets being continuously input into the trunk interface module can be considerably reduced. As a consequence, there is a very small probability that data packets to be sent to a trunk interface module will wait at a terminal interface module.

BRIEF DESCRIPTION OF THE DRAWINGS

For a better understanding of the present invention, reference is made, to the following descriptions in conjunction with the accompanying drawings, in which.

DETAILED DESCRIPTION OF THE PREFERRED EMBODIMENTS

BASIC IDEA

Before proceeding with various types of the packet communication exchange according to the present invention, a basic idea of the packet communication exchange capable of controlling a load condition in accordance with the invention will now be summarized.

A plurality of input modules and output modules are interconnected via a common communication line to each other. A plurality of input/output data lines are connected to the respective input/output modules. Each of the input modules includes a means for monitoring data packet contentions appearing on the communication line, and a means for controlling a data packet transmission to the communications line; based upon the results of the monitored packet contention. In the respective output modules, there are employed a means for temporarily storing the data packets received from the communication line a means for producing a dummy packet control signal by checking a quantity of data packets (i.e., a queue packet length) stored in the storing means; and a means for generating and sending a dummy packet to the communication line in response to the dummy packet control signal. When the queue packet length exceeds a threshold level, the dummy packet control signal is produced. As a result of the dummy packet generation, data packet contentions occur on the communication line, so that the monitor means of the input module detects the occurrence of the data packet contention. Thus, the control means of the input means controls transmission of new data packets to the communication line so as to avoid a further packet contention. As a consequence, the queue packet length of the output module is reduced, so that the data packet's discard due to the overflowed data packets in the storing means can be prevented.

FIRST BUS ACCESSING TYPE PACKET COMMUNICATION EXCHANGE

A description will now be made concerning a bus accessing type packet communication exchange 100 employing a load controlling system according to a first preferred embodiment of the invention.

Figure 1:
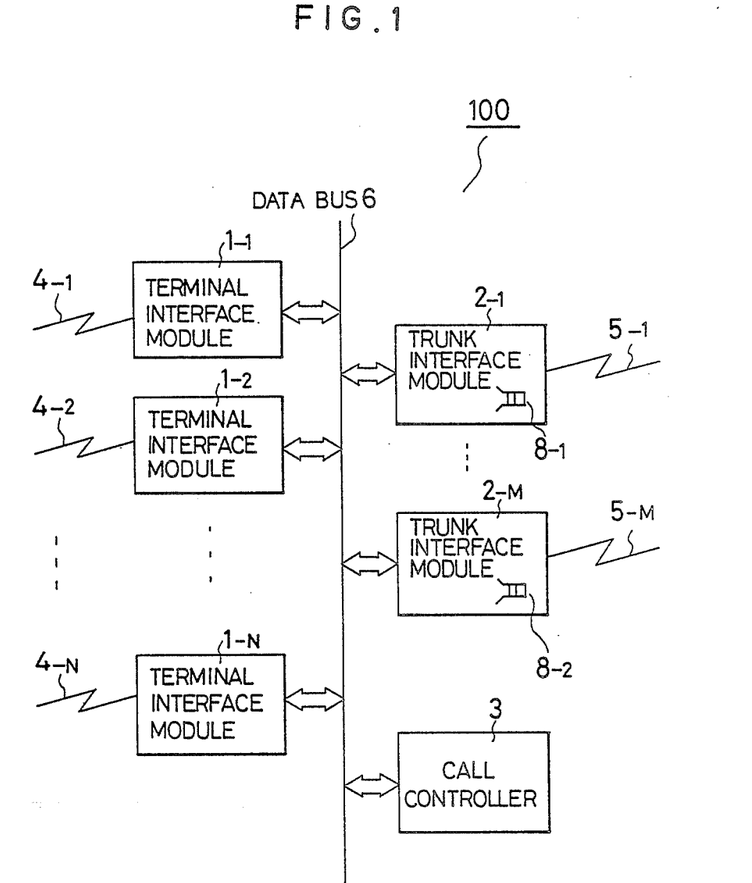
FIG. 1 is a schematic block diagram of a bus accessing type packet communication exchange 100 employing a load controlling system according a first preferred embodiment of the invention.
Figure 2:
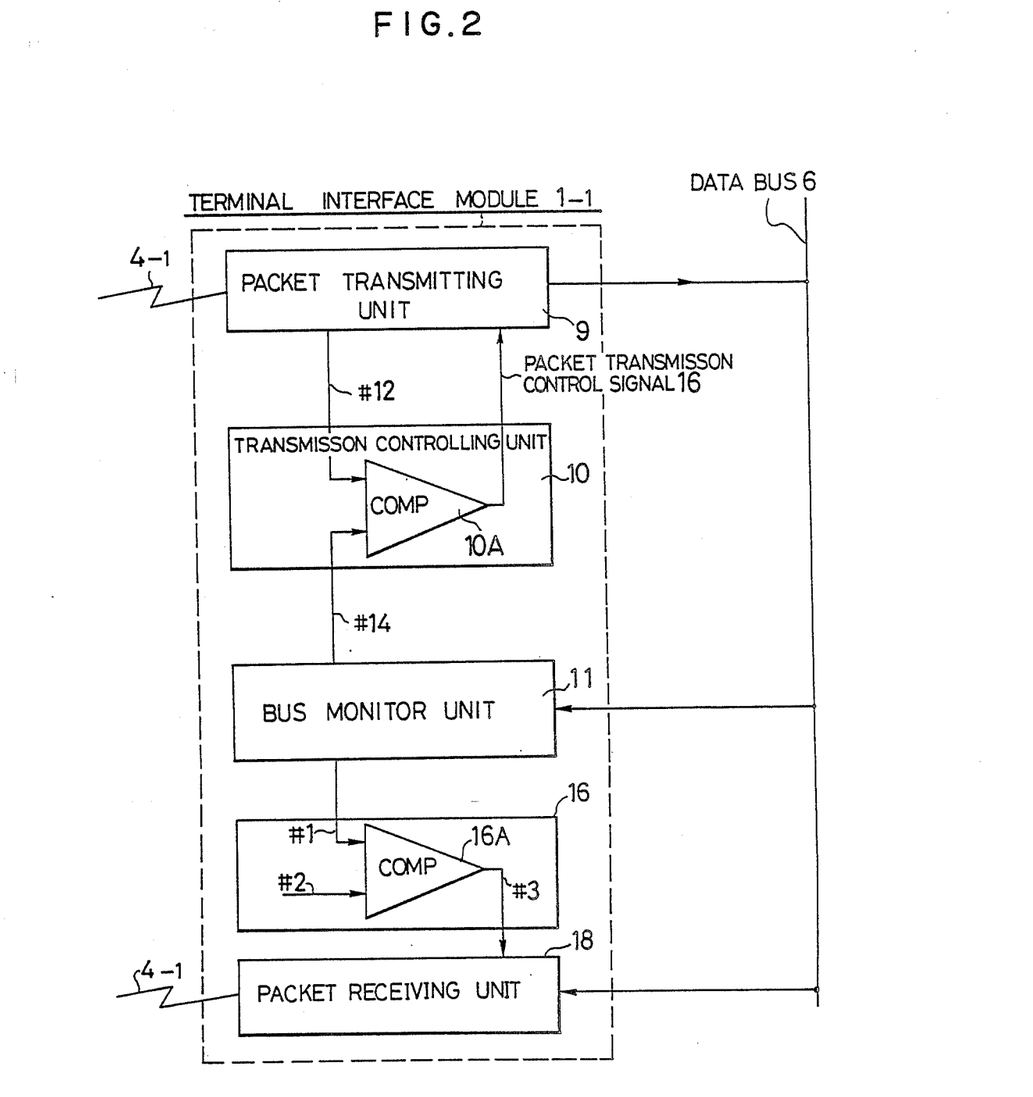
FIG. 2 is a schematic block diagram of an internal circuit of the terminal interface module shown in FIG. 1.
Figure 3:
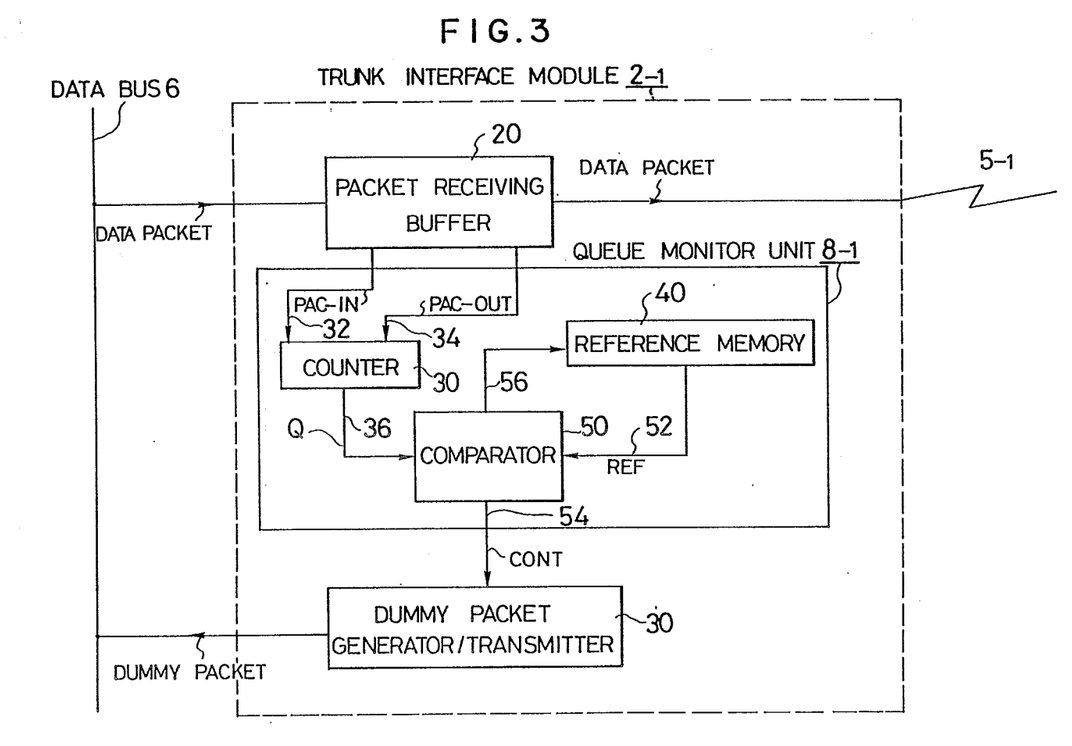
FIG. 3 is a schematic block diagram of an internal circuit of the trunk interface unit illustrated in FIG. 1.

FIG. 1 is an overall arrangement of the bus accessing type packet communication exchange 100. FIG. 2 is an internal circuit of the terminal interface module shown in FIG. 1. FIG. 3 is an internal circuit of the trunk interface module illustrated in FIG. 1.

In the bus accessing type pocket communication exchange 100 according to the first preferred embodiment, a plurality of terminal interface modules 1-1 to 1-N (N≧2) are connected to a common data bus 6. Similarly, a plurality of trunk interface modules 2-1 to 2-M (M≧2) are connected to this data bus 6. A call controller 3 is also connected to the data bus 6. When these modules 1-1 to 1-N and 2-1 to 2-M simultaneously access the data bus 6 for the packet communication purposes contention disputes between the modules occur on this data bus 6. According to the preferred embodiment, in case a module contention occurs on the data bus 6, each of these modules 1 and 2 has a function capable of monitoring the result of this contention, and the module which had failed in this contention can again access the data bus in the subsequent accessing timing.

Specifically, in the corresponding trunk interface modules 2-1 to 2-M, there are employed a plurality of queue monitor units 8-1 to 8-M. One end of plural trunk lines 4-1 to 4-N is connected to the respective terminal interface modules 1-1 to 1-N, whereas the other end thereof is connected to each of terminals (not when in detail). Similarly, a plurality of trunk lines 5-1 to 5-M are connected to the corresponding trunk interface modules 2-1 to 2-M.

INTERNAL ARRANGEMENT OF TERMINAL INTERFACE MODULE

Referring now to FIG. 2, an internal arrangement of the terminal interface module 1-1 will now be described. It should be understood that each of the remaining terminal interface modules 1-2 through 1-N employs the same internal arrangement as that of FIG. 2.

As shown in FIG. 2, this terminal interface module 1-1 includes a packet transmitting unit 9, a packet transmission controlling unit 10, a bus monitor unit 11, a reception controlling unit 16, and a packet receiving unit 18. The packet transmission controlling unit 10 includes a comparator 10A. The reception controlling unit 16 includes a comparator 16A.

In the terminal interface module 1-1, the bus monitor unit 11 functions to monitor the results of the data bus contention, and continuously reports the contention results to the transmission controlling unit 10. The function of the transmission controlling unit 10 is to control a time period during which the packet transmitting unit 9 of the terminal interface unit 1-1 stops accessing the data bus 6 under the condition that this terminal interface unit 1-1 failed in the data bus contention.

More specifically, a header #12 of the packet in contention at the bus 6, which has been input from the terminal side (not shown) into the packet transmitting unit 9 is supplied to one input terminal of the comparator 10A. A contention result #14 sent from the bus monitor unit 11, is supplied to the other input terminal of this comparator 10A. When comparing the header #12 with the contention result #14, and the contention header #12 corresponds to the contention result #14, a control signal 16 for controlling the bus access by the data packet is transmitted from an output terminal of the comparator 10A to the packet transmitting unit 9.

From the bus monitor unit 11, a destination address #1 to be sent to the data bus is derived and then supplied to one input of the comparator 16A in the reception controlling unit 16. To the other input of this comparator 16A, an address #2 specific to the terminal interface module 1-1 is supplied. Thus, the comparator 16A compares the destination address #1 with the specific address #2, and outputs a result signal #3 to the packet receiving unit 18. When the destination address #1 is equal to the specific address #2, the packet receiving unit 18 fetches the data packet.

On the other hand, the packet transmitting unit 9 controls sending the packet to the data bus 6 in response to the packet transmission control signal 16.

INTERNAL ARRANGEMENT OF TRUNK INTERFACE MODULE

Referring now to FIG. 3, an internal arrangement of the trunk interface module 2-1 will be described. The trunk interface module 2-1 is mainly constructed by a packet receiving buffer 20, a queue monitor unit 8-1 and a dummy packet generator/transmitter 30. The packet receiving buffer 20 receives the packets from the data bus 6, and temporarily stores them. Thus, the queue packets (a queue packet length "Q") temporarily stored in the buffer 20 are continuously monitored by the queue monitor unit 8-1. When the queue packet length "Q" monitored by the queue monitor unit 8-1 exceeds a predetermined first threshold level, a control signal 54 is supplied from the queue monitor unit 8-1 to the dummy packet generator/transmitter 30. In response to this control signal, a dummy packet is generated and thereafter transmitted to the data bus 6 from the dummy packet generator/transmitter 30. In other words, if the amount of the packets (i.e., queue packet length "Q") temporarily stored in the packet receiving buffer 20 is greater than the first threshold value (level), namely, if the waiting time of the packet to be output to the trunk line 5-1 is longer than a predetermined time, the dummy packet is produced and sent to the data bus 6. As a result, the terminal interface module 1-1 can access the data bus 6 where the contention is reduced.

There are two different types of dummy packets derived from the packet generator/transmitter 30. First, a dummy packet is such that this packet surely wins the bus contention. Another dummy packet is such that this packet has a high probability to win the bus contention. That is, while the queue packet length of the trunk interface module 2-1 is greater than the first threshold level and thereafter, this queue packet length is smaller than a predetermined second threshold level, this trunk interface module 2-1 generates the dummy packets and sends them to the data bus 6. As a consequence, the packet transmission timing from the terminal interface module 1-1 is controlled.

That is to say, when the dummy packets are transmitted to the data bus 6, this condition on the data bus 6 is monitored by the bus monitor unit 11 of the terminal interface module 1-1. Based on the monitoring result, the packet transmission from the packet transmitting unit 9 of the terminal interface unit 1-1 to the data bus 6 is controlled. In this case, there are four bus-access waiting methods for this terminal interface module 1-1 (will be discussed later). Thus, the packet transmitting unit 9 accesses the data bus 9 at a bus accessing timing determined by these bus-access waiting methods.

It should be noted that since the above-described internal arrangement of the trunk interface module 2-1 is the same as that of the remaining trunk interface modules 2-2 to 2-M, no description thereof is made.

DUMMY PACKET GENERATION

Figure 4:
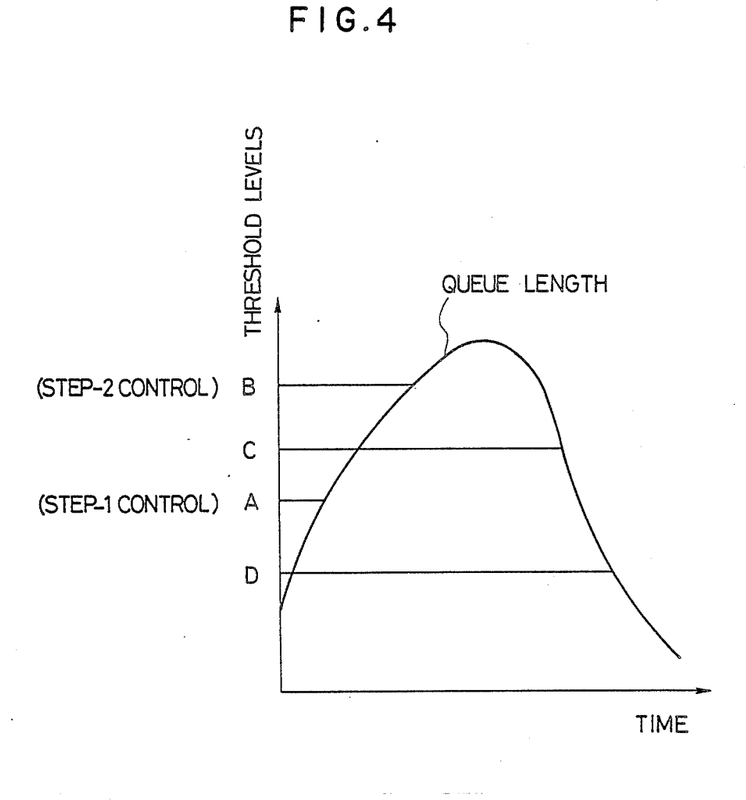
FIG. 4 is a graphic representation for showing a relationship between the queue packet length and threshold levels.

Referring now to also FIG. 4, a detailed description will be made of the above-described dummy packet generation. FIG. 4 is a graphic representation showing a relationship between threshold values "A" to "D" which have been previously stored in the reference memory 40 of the queue monitor unit 8-1, the queue packet length and the time lapse.

Upon receipt of the data packet from the data bus 6 into the packet receiving buffer 20 shown in FIG. 3, a first output signal (PAC-IN) 32 is output from packet receiving buffer 20. This first output signal 32 is supplied to one input terminal of the counter 30. When the data packet temporarily stored in this buffer 20 is output to, for instance, the trunk line 5-1, a second output signal (PAC-OUT) 34 is output, and then supplied to a second input terminal of the counter 30. Upon receipt of the first output signal 32, this counter 30 counts up its count value by $+1$, whereas this counter 30 counts down its count value by $-1$ when the receiving the second output signal. As a result, the counter 30 outputs the number of the data packets which are stored in the buffer 20.

This output 36 from the counter 30 is supplied to one input terminal of the comparator 50, whereas a reference value 52 derived from the reference memory 40 is supplied to the other input terminal thereof. These input values are compared in this comparator 50. A control signal 54 is derived from this comparator 50 when the load control is required in the packet communication exchange 100, and then supplied to the dummy packet generator/transmitter 30, whereby the necessary dummy packets are sent to the data bus 6.

A comparison result signal 56 is fed back to the reference memory 40 from the comparator 50.

The reference value 52 previously stored in the reference memory 40 will now be described.

As illustrated in FIG. 4, according to the preferred embodiment, four threshold levels "A" to "D" for the load controlling criterion have been employed. These four levels "A" to "D" have been previously stored in the reference memory 40 of the queue monitor unit 8-1.

The first threshold level "A" is to commence a step-1 control. The second threshold level "B" is to start a step-2 control. The third threshold level "C" is to release the step-2 control. Finally, the fourth threshold level "D" is to release the step-1 control. In general, the relationships between them are set as follows:

$A \geq D$, $B \geq C$, and furthermore $C \geq A$.

Figure 5:
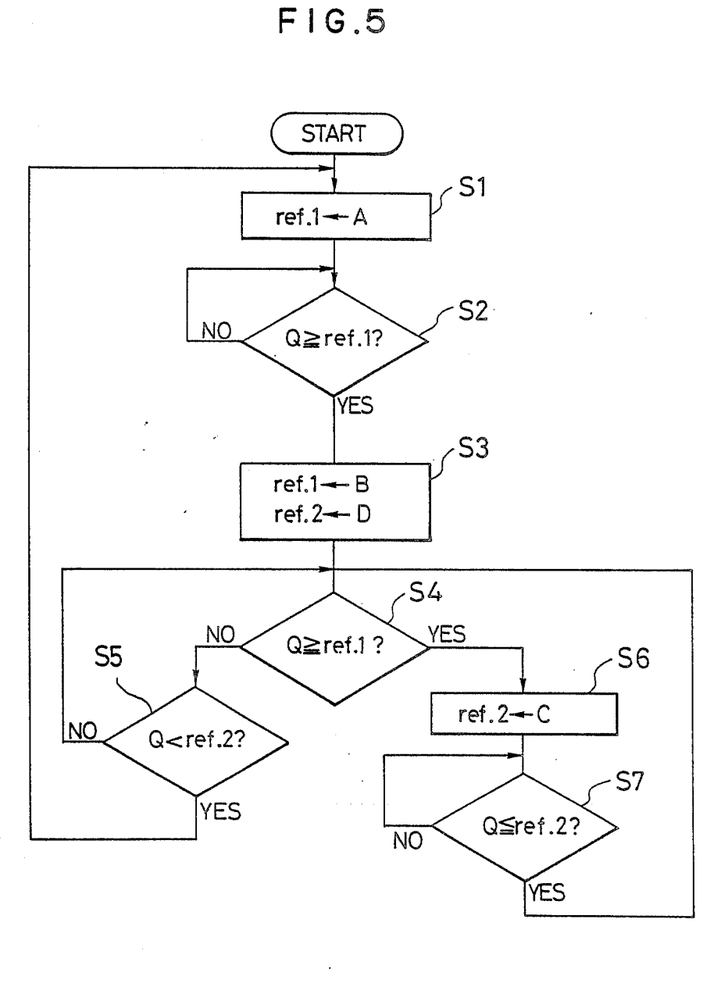
FIG. 5 is a flowchart for explaining the operations of the queue monitor unit shown in FIG. 1.

Then, a comparison operation by the queue monitor unit 8-1 in the first data bus accessing type packet communication exchange 100, as a major feature thereof, will now be described with reference to a flowchart shown in FIG. 5, and also the circuit of FIG. 3.

In a first step S1, the above-described first threshold level "A" is set into the memory 40 as a reference value No. 1. In a next step S2, an amount of the queue packets, i.e., the queue packet length "Q" which has been stored in the packet receiving buffer 20 is supplied from the counter 30 into one input terminal of this comparator 50. The reference value No. 1 (referred to as "ref. 1") which has been set in the reference memory 40 is supplied to the other input terminal of the comparator 50 for the comparison purpose. If No, then the process is returned to the previous step S2. If Yes, then the process is advanced to a next step S3. In this step S3, the second threshold level "B" and fourth threshold level "D" are set as the reference values No. 1 and No. 2 into the reference memory 40. As a result, the output signal 54 of the comparator 50 corresponds to a step-1 control signal.

In the subsequent step S4, a check is made whether or not this newly set reference value No. 1 is greater than the above-described queue packet length "Q". If No, the process is advanced to a step S5, where another check is made on Q < ref. 2. If No again, the process is returned to the previous step S4. To the contrary, if Yes in this step S5, the process is returned to the first step S1 since the queue packet length "Q" which has been stored in the packet receiving buffer 20 is lower than the minimum threshold level "D" (see FIG. 4). That is to say, this condition implies that there is a least amount of the queue packets temporarily stored in the buffer 20. At this case, the output signal 54 of the comparator 50 corresponds to a step-1 control release signal.

In the step S4, on the other hand, if a judgement result is Yes, the process is advanced to a next step S6. In this step, the third threshold level "C" is newly set as the reference value No. 2 in the reference memory 40. As a result, the output signal 54 of the comparator 50 corresponds to a step-2 control signal. In the subsequent step S7, a judgement is made whether or not the queue length "Q" is lower than this new reference value No. 2. If No, then the process is again returned to the step S7. To the contrary, if Yes, the process is returned to the previous step S4. In this case, since the present queue packet length "Q" is smaller than the third threshold level "C", the output signal 54 of the comparator 50 corresponds to the step-1 control signal.

The above-described step control operations will now be summarized.

When the queue packet length "Q" exceeds the first threshold level "A", the step-1 control is performed (namely, the dummy packets are sent from the dummy packet generator/transmitter 30 to the data bus 6.) As a consequence, the amount of the queue packets (i.e., the queue packet length "Q") becomes small, and thereafter becomes lower than the fourth threshold level "D". At this time, this step-1 control is accomplished, or ended. When the amount of the queue packets exceeds the second threshold level "B", the step-2 control is executed. Thereafter, when this amount is lower than the third threshold level "C", this step-2 control is completed, or stopped.

There has been described in detail, only when the amount of the data packets to be sent to the trunk line 5, which have been temporarily stored in the packet receiving buffer 20 of the trunk interface module 2, i.e., the queue packet length "Q" is within a predetermined quantity which is determined by the first to fourth threshold levels "A" to "D", the dummy packets are transferred from the dummy packet generator/transmitter 30 to the data bus 6 in order to perform the load control of the packet communication exchange 100.

LOAD CONTROLLING METHOD

A description will now be made on the load control method of the bus accessing type packet communication exchange 100 according to the first preferred embodiment with reference to FIGS. 1 to 3.

That is, the load control of the packet communication exchange 100 is performed in such a manner that, for instance, the terminal interface module 1-1 again performs the bus accessing operation to the data bus 6 after a predetermined time period has passed, when this terminal interface module 1-1 fails in the packet transmission contention occurring in the data bus 6. The packets are to be transmitted from this terminal interface modules 1-1 to 1-N. The waiting time period for the bus accessing operation when the module fails in the packet transmission contention, will be determined based on the following four systems.

(1) The data bus accessing operation waits more than two times for the same predetermined time periods at the respective modules. Thereafter, this accessing operation is performed at the subsequent access timing.

(2) The data bus accessing operation waits only one time for the same predetermined time periods at the respective modules.

(3) The data bus accessing operation waits more than two times only for a time period specific to each of the modules.

(4) The data bus accessing operation waits only one time for a time period specific to each of the modules.

The above-described waiting time determination methods will now be explained in detail.

In the packet communication exchange 100 according to the first preferred embodiment, as illustrated in FIGS. 1 to 3, the load control of this exchange 100 is carried out based upon the queue packet length "Q" temporarily stored in the packet receiving buffer 20. The bus monitor unit 11 of the terminal interface module 1 shown in FIG. 2 functions to monitor the contention result on the data bus 6. Then, the contention result is continuously announced to the transmission controlling unit 10. This transmission controlling unit 10 controls the bus accessing interruption time when the module in question fails in the packet contention occurring on the data bus 6 in accordance with the contention result thereon. As previously described, in case that the bus accessing operation waits more than two times for the same predetermined time periods at the respective terminal modules (No. 1) and also waits more than two times for the time period specific to the respective terminal modules, there are two different controlling ways for the bus accessing interruption time. First, the transmission controlling unit 10 in the terminal interface module 1 controls the bus accessing interruption time. Secondly, the transmission controlling unit 10 merely announces to the packet transmitting unit 9 that the module in question fails in this contention, and the packet transmitting unit 9 receiving this announcement controls the bus accessing interruption time.

On the other hand, in the case when the data bus accessing operation waits only one time for the same predetermined time periods at the respective terminal interface modules (No. 2), and also waits only one time for the time specific to the respective terminal interface modules, either the transmission controlling unit 10, or the packet transmitting unit 9 furthermore functions to confirm whether or not the present contention occurring on the data bus corresponds to a first contention. Then, the data bus accessing operation by this module is carried out at the original bus synchronization timing after occurrences of the second contention and the subsequent contentions.

SECOND BUS ACCESSING TYPE PACKET COMMUNICATION EXCHANGE

A bus accessing type packet communication exchange 200 according to a second preferred embodiment will now be described.

Figure 6:
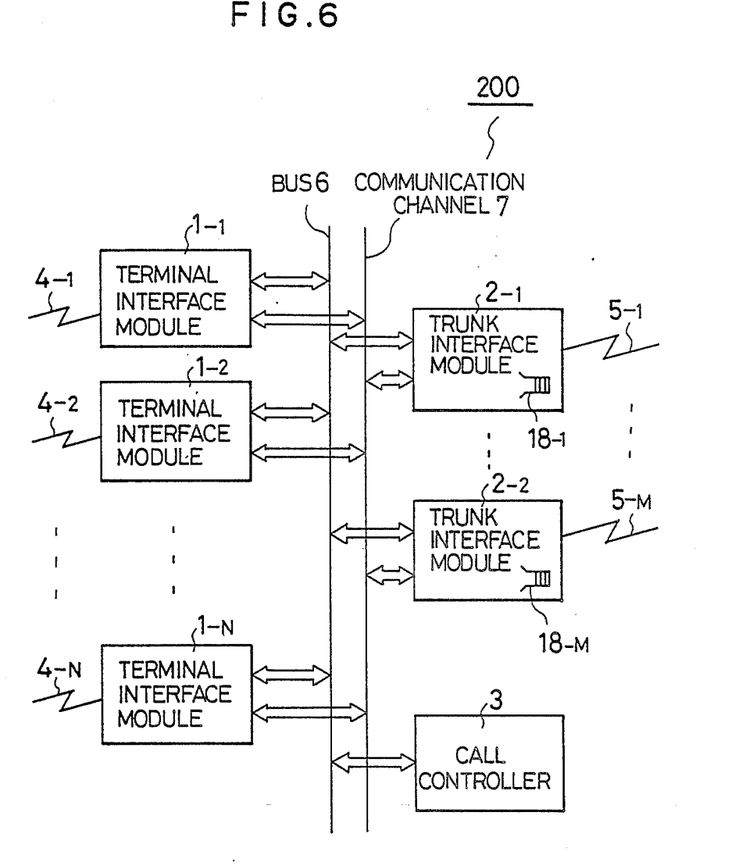
FIG. 6 to 8 are schematic block diagrams of a bus accessing type packet communication exchange 200 according to a second preferred embodiment.
Figure 7:
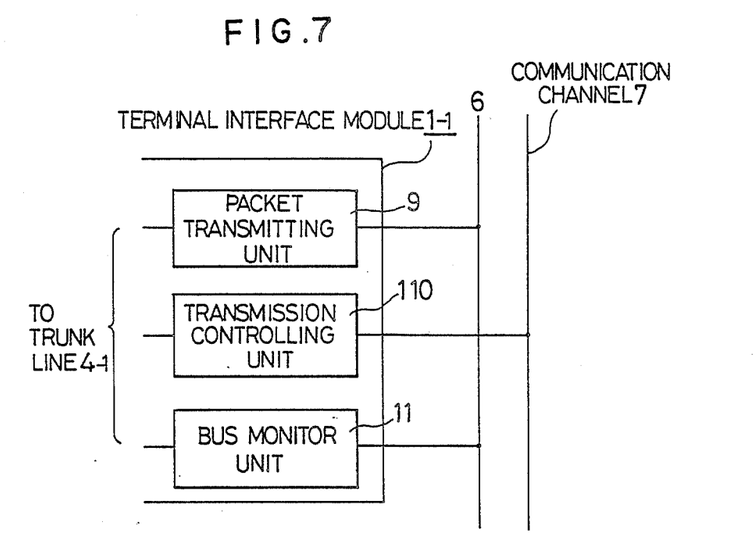

In FIG. 6, there is shown an entire circuit arrangement of the exchange 200. FIG. 7 is an arrangement of the terminal interface module shown in FIG. 6, and FIG. 8 is an arrangement of the trunk interface module shown in FIG. 6.

Figure 8:
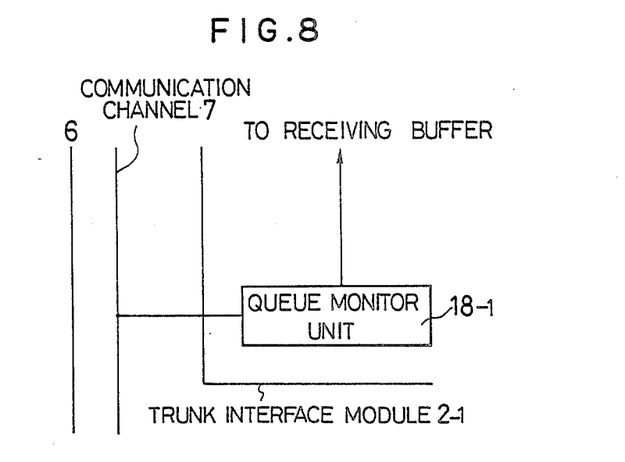

It should be noted that the same reference numerals denoted in the first preferred embodiment will be employed to indicate the same or similar circuit elements shown in FIGS. 6 to 8, and no further explanation thereof is made.

In FIG. 6, a plurality of terminal interface modules 1-1 to 1-N are similarly connected to the data bus 6. A plurality of trunk interface modules 2-1 to 2-M are also connected to the common data bus 6. The call controller 3 is connected to the data bus 6. The queue monitor units 8-1 to 8-M are employed within the corresponding trunk interface modules 2-1 to 2-M. A communication channel 7 is employed to be connected to these terminal interface modules 1-1 to 1-N and trunk interface modules 2-1 to 2-M. The function of this communication channel 7 is to send the control information from the trunk interface modules 2-1 to 2-M to the terminal interface modules 1-1 to 1-N. The flow of the information signal is as follows. For instance, the data packets are input from the trunk lines 5-1 to 5-M connected to the trunk interface modules 2-1 to 2-M, whereas the data packets are output from the trunk lines 4-1 to 4-N connected to the terminal interface modules 1-1 to 1-N. Also, in the second preferred embodiment, the terminal interface modules 1-1 to 1-N are connected to the trunk interface modules 2-1 to 2-M via the synchronization type data bus 6 as the communication medium, which is similar to the first preferred embodiment. That is, the packet transmission contention is controlled by employing this synchronization type bus switch.

As shown in FIG. 8, the trunk interface module 2-1 includes a queue monitor unit 18-1 for monitoring the amount of the queue packets temporarily stored in the packet receiving buffer 20, and the communication channel 7 for transferring the control signal to the terminal interface module 1-1 shown in FIG. 6. The queue monitor unit 18-1 detects two when cases: the amount of the queue packets in the buffer exceeds over a predetermined value, and when the amount thereof becomes smaller than this value. As a result of this detection, the queue monitor 18-1 sends a control signal to the terminal interface module 1 so as to control the bus accessing interruption time when this terminal interface module 1 fails in the packet contention occurring on the data bus 6.

The terminal interface module 1-1 includes the packet transmitting unit 9, a transmission controlling unit 110, a bus monitor unit 11 and the communication channel 7, as illustrated in FIG. 7. The bus monitor unit 11 functions to monitor the contention results occurring on the data bus 6 and to send the contention results to the transmission controlling unit 110. The functions of the transmission controlling unit 110 are to confirm the control signal which has been sent from the trunk interface module 2 via the communication channel 7; to control the packet transmitting unit 9 based upon the content of this control signal when the terminal interface module in question fails in the contention; and finally to control the bus accessing timing by the terminal interface module 1.

It should be noted that the bus accessing interruption time of the packet transmission unit 9 can be controlled based on the above-explained four determination methods in case of the contention failure.

It has been described that, in the exchange 200 according to the second preferred embodiment shown in FIGS. 6 to 8, the load control operation of the exchange 200 is performed only when there is a predetermined amount of the queue packets in the buffer of the trunk module 2, and the memory capacity of this buffer connected to the respective queue monitor units 18-1 to 18-M is within a constant value. In other words, the load control of the exchange 200 is performed based upon the queue packet length "Q" in the buffer.

THIRD BUS ACCESSING TYPE PACKET COMMUNICATION EXCHANGE

Figure 9:
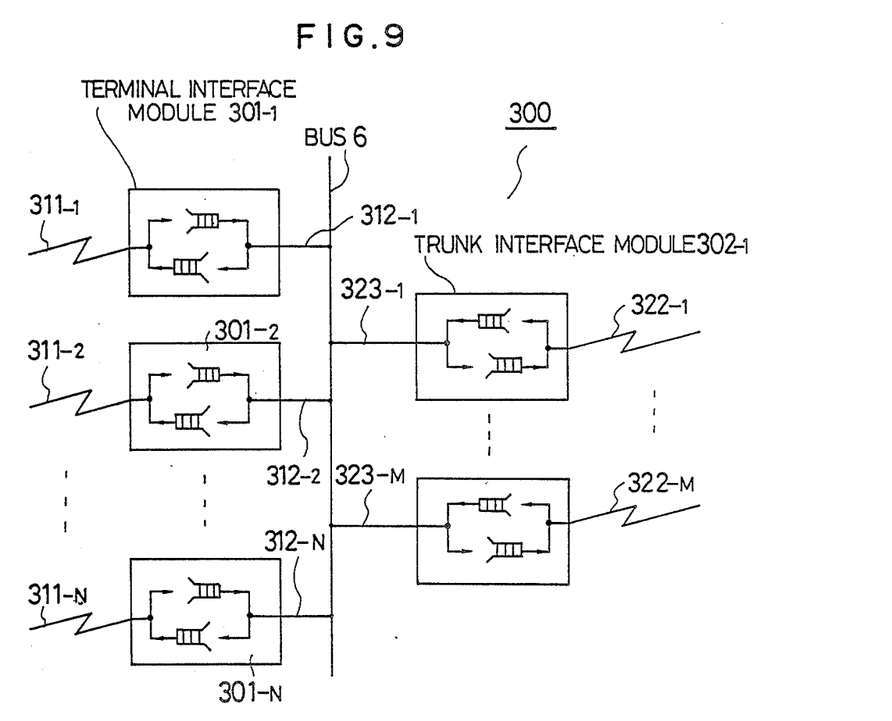
FIG. 9 through 11 are schematic block diagrams of a bus accessing type packet communication exchange 300 according to a third preferred embodiment; and, FIG. 12 and 13 are schematic block diagrams of a bus accessing type packet communication exchange 400 according to a fourth preferred embodiment.
Figure 10:
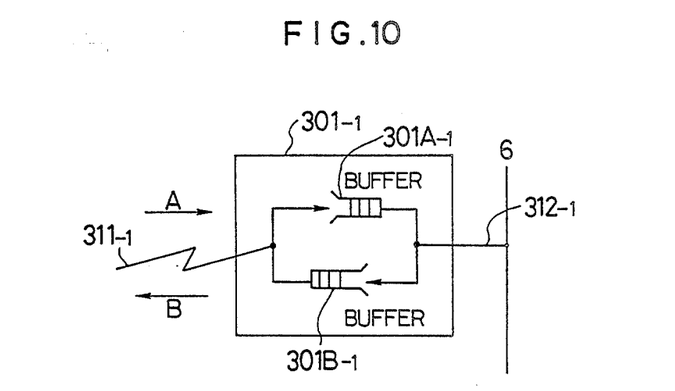
Figure 11:
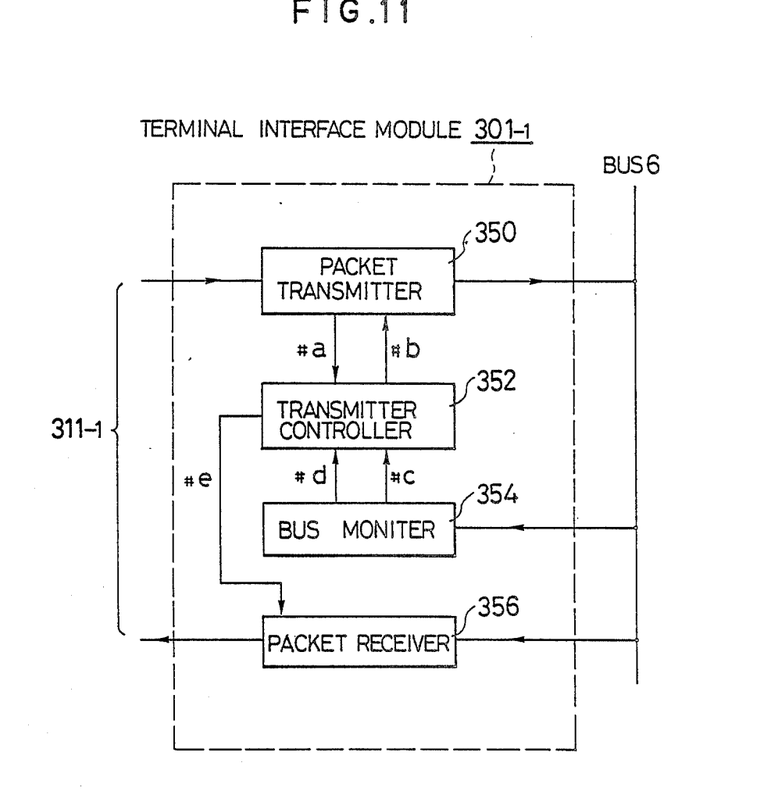

Referring now to FIGS. 9 to 11, a bus accessing type packet communication exchange 300 will be described.

In FIG. 9, there is shown an entire arrangement of the exchange 300. "N" stages of terminal interface modules 301-1 to 301-N are connected via terminal trunk lines 311-1 to 311-N and lines 312-1 to 312-N capable of performing bidirectional communications to the data bus 6. Similarly, "M" stages of trunk interface modules 302-1 to 302-M are connected to the common data bus 6 via high-speed digital trunk lines 322-1 to 322-M and 323-1 to 323-M capable of performing bidirectional communication.

Both the terminal interface modules 301 and trunk interface modules 302 have the same internal arrangements, as illustrated in FIG. 10. That is, two buffers 301A-1 and 301B-1 are included in the terminal interface module 301-1 shown in FIG. 10.

Operations of this exchange 300 will be summarized.

First, a data packet is input as a stream "A" into the buffer 301A-1. A contention information signal of a head packet of this data packet is output to the data bus 6.

Then, while monitoring the contention result on the data bus 6, the data packet is output from the buffer 301A-1 to the data bus 6 if this terminal interface module 301-1 wins the packet contention. In this case, before outputting the data packet, a destination address is output to the data bus 6. To the contrary, when the terminal interface module 301-1 fails in this packet contention, no data packet is output from the buffer 301A-1 to the bus 6.

When the destination address of the data packet output on the data bus 6 is coincident with another destination address of its own module, for instance, the terminal interface module 301-1, this data packet is fetched into the buffer 301B-1 of its own module. Thereafter, the data packet is output from this buffer 301B-1 as a stream B to the trunk line 311-1.

An internal arrangement of the terminal interface module 301 is shown in FIG. 11. This internal arrangement is the same as that of the trunk interface module 302. This module 301 is arranged by a packet transmitter 350, a transmitter controller 352, a bus monitor 354 and a packet receiver 356. In this packet transmitter 350 and packet receiver 356, the above-described buffers 301A-1 and 301B-1 are built.

Various signals of the terminal interface modules 301-1 will now be described.

A signal #a indicates a contention information signal to be output to the data bus 6. A signal #b is an announcement signal for announcing the contention result. A signal #c is produced by comparing the first signal #a with the second signal #b. Another signal #d indicates a destination address of the data packet output to the data bus 6. A signal #e is a signal for announcing whether or not the data packet output to the data bus 6 is fetched.

In the transmitter controller 352, the comparison operations are performed between the first and second signals #a and #b, and furthermore between the fourth signal #d and the address of its own module.

FOURTH BUS ACCESSING TYPE PACKET COMMUNICATION EXCHANGE

Figure 12:
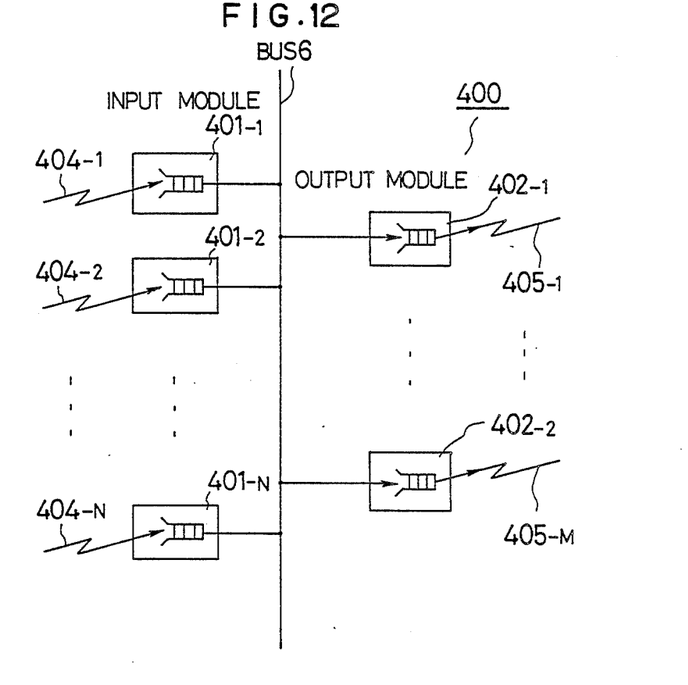

A bus accessing type packet communication exchange 400 according to a fourth preferred embodiment of the invention will now be described with reference to FIGS. 12 and 13.

"N" stages of input modules 401-1 to 401-N are connected to the common data bus 6, and "M" stages of output modules 402-1 to 402-M are also connected thereto. Both the input modules 401-1 to 401-N and output modules 402-1 to 402-M are connected to trunk lines 404-1 to 404-N and 405-1 to 405-M. In accordance with the preferred embodiment, these input and output modules may be connected to terminal interface trunk lines, or multiplexed lines (not shown in detail), instead of the trunk lines.

Figure 13:
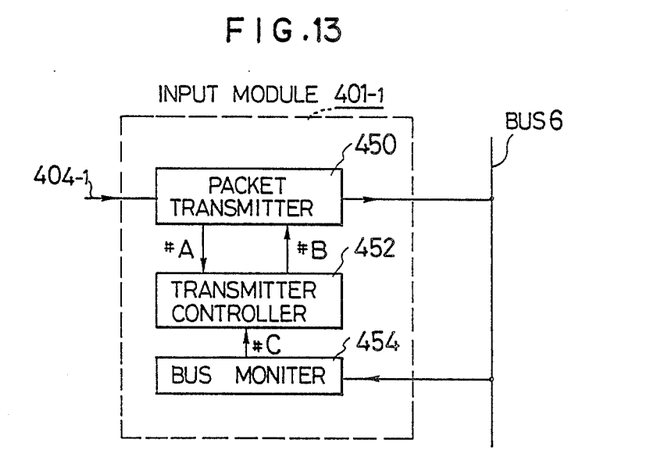

FIG. 13 is an internal arrangement of the input module 401-1. The input module 401-1 includes a packet transmitter 450, a transmitter controller 452, and a bus monitor 454. First, a contention information signal #A to be output to the data bus 6 is supplied to the transmitter controller 452 from the packet transmitter 450. A contention result signal #B is supplied from this transmitter controller 452 to the packet transmitter 450. Also, the bus monitor 454 which has received the information for announcing the contention result on the data bus 6, delivers a packet contention result signal #C to the transmitter controller 452.

It should be noted that since the internal arrangements of the output modules 402-1 to 402-M are the same as those of the truck interface modules 2-1 to 2-M according to the first preferred embodiment (see FIG. 3), no further description thereof is made in the specification.

With the above-described circuit arrangements, the packet communication exchange 400 can perform the load control according to the invention even if the output modules include no bus monitor.

The load controlling operation of this exchange 400 is as follows.

When the queue packet length exceeds a predetermined threshold level, the dummy packets are generated and transferred to the data bus 6 from the output module 402-1. Thus, the bus monitor 405 of the input module 401-1 detects the packet contention occurring on the data bus 6 caused by supplying the dummy packets from the output module 402-1 to the data bus 6. Upon detection of the packet contention, the transmitter controller 452 sends the contention result signal #B to the packet transmitter 450. As a consequence, the packet transmitter 450 does not transmit a new data packet to the data bus 6 so as to avoid a further packet contention thereon. Therefore, the data packet's discard due to an overflowing data packet from the buffer of the output module can be prevented.

MODIFICATIONS

As is apparent from the foregoing, the present invention is not limited to the above-described preferred embodiments.

For instance, the load control method according to the invention may be applied to not only the above-described bus accessing type packet communication exchanges, but also to a CSMA/CD (carrier sense multiple access / collision decision) type exchange. In other words, the present invention may be realized in any type of packet communication exchanges where the data packet communication is performed via the common communication medium, and the contention control is performed by using the dummy packets in order to obtain the accessing right to utilize this common communication path.

It is not required that each of the communication devices or modules is synchronized with the packet transfer phase.

A wireless communication path may be used as the common communication path such as the data bus 6.

The four reference values "A" to D for transferring the dummy packets to the data bus 6 may be changed into other values.

A degree of dummy packet transmission may be stepwise varied in accordance with the queue packet length.

Furthermore, the communication module where the queue packet length becomes large is indicated by a newly introduced control packet. Then, based upon this indication signal, a limitation may be made in the data packet transmission by the communication module where the queue packet length becomes large.

Before the data packets are multiplexed in the trunk interface module, these data packets may wait at the terminal interface module.

In the above-described preferred embodiments, the contention on the data bus was effected between the data packets and the dummy packets. Alternatively, the contention on the data bus may be effected between the dummy packets only.

Thus it has been described, in the packet communication exchange according to the invention that, the dummy packets are generated depending upon the length of the queue packets temporarily stored in the buffer memory employed in the trunk interface module, whereby the data packet transmission by the terminal interface module to the common, communication path is controlled. As a consequence, the probability that excessive data packets are continuously input into the above-described buffer memory can be reduced to a very small value. In addition, the probability that the packets are discarded, which is caused by the large queue packet length in the buffer memory can be also reduced to a very small value.

What is claimed is:

1. A packet communication exchanging apparatus comprising:
   a common communication channel through which a plurality of data packets are communicated;
   a plurality of input module means, coupled to said common communication channel, for receiving data packets and transferring data packets to said communication channel; and,
   a plurality of output module means, coupled to said common communication channel, for temporarily storing data packets sent from said input module means via said communication channel, and for generating and sending a dummy packet to said communication channel when an amount of data packets temporarily stored therein exceeds a predetermined threshold value, whereby said input module means detects a packet contention occurring on said communication channel due to said dummy packet supplied thereto so as to control data packet transmission from said input module means to said communication channel.

2. A packet communication exchanging apparatus as claimed in claim 1, wherein said input module means includes:

a bus monitor for monitoring said packet contention occurring on said communication channel to output a contention result signal;

transmitter controller for receiving said contention result signal to produce a contention control signal; and, a packet transmitter for controlling data packet transmission based upon said contention control signal.

3. A packet communication exchanging apparatus as claimed in claim 1, wherein said output module means includes:

a buffer memory for temporarily storing data packets sent from the said input module means via said communication channel;

a queue packet monitor unit for monitoring an amount of queue data packets temporarily stored in said buffer memory so as to produce a contention control signal when said queue packet amount exceeds said threshold value; and, a dummy packet generator and transmitter for generating a dummy packet in response to said contention control signal and for transmitting said dummy packet to said communication channel.

4. A packet communication exchanging apparatus as claimed in claim 3, wherein said queue packet monitor unit includes;

a counter for counting a quantity of queue data packets temporarily stored in said buffer memory by receiving a packet reception signal and a packet transmission signal derived from said buffer memory;

a reference memory for previously storing a threshold value; and, a comparator for comparing said quantity of queue data packets with said threshold value so as to output said contention control signal.

5. A packet communication exchanging apparatus as claimed in claim 1, wherein said common communication channel is a data bus.

6. A packet communication exchanging apparatus as claimed in claim 1, wherein said common communication channel is a wireless communication path.

7. A packet communication exchanging apparatus as claimed in claim 1, wherein said packet contention on said communication channel is caused by both data packets and a dummy packet.

8. A packet communication exchanging apparatus as claimed in claim 1, wherein said packet contention on said communication channel is caused by a plurality of dummy packets only.

9. A packet communication exchanging apparatus comprising:

a data bus through which a plurality of data packets are communicated;

a plurality of terminal interface module means, coupled to said data bus, for receiving data packets and transferring data packets to said data bus; and a plurality of trunk interface module means coupled to said data bus, for temporarily storing data packets sent from said terminal interface module means via said data bus, and for generating and supplying a dummy packet to said data bus when an amount of data packets temporarily stored therein exceeds a predetermined threshold value, whereby said terminal interface module means detects a packet contention occurring on said data bus due to said dummy packet supplied thereto so as to control data packet transmission from said terminal interface module means to said data bus.

10. A packet communication exchanging apparatus as claimed in claim 9, wherein said terminal interface module means includes:

a bus monitor for monitoring said packet contention occurring on said data bus to output a contention result signal;

a transmission controlling unit for receiving said contention result signal to produce a packet transmission control signal; and a packet transmitting unit for controlling data packet transmission based upon said packet transmission control signal.

11. A packet communication exchanging apparatus as claimed in claim 9, wherein said trunk interface module means includes:

a buffer memory for temporarily storing data packets sent from said terminal interface module means via said data bus;

a queue packet monitor unit for monitoring an amount of queue data packets temporarily stored in said buffer memory so as to produce a contention control signal when said queue packet amount exceeds said threshold value; and, a dummy packet generator and transmitter for generating said dummy packet in response to said contention control signal and for transmitting said dummy packet to said data bus.

12. A packet communication exchanging apparatus as claimed in claim 11, wherein said queue packet monitor unit includes;

a counter for counting a quantity of queue data packets temporarily stored in said buffer memory by receiving a packet reception signal and a packet transmission signal derived from said buffer memory;

a reference memory for previously storing said threshold value; and a first comparator for comparing said quantity of queue data packets with said threshold value so as to output said contention control signal.

13. A packet communication exchanging apparatus as claimed in claim 9, wherein said threshold value is determined at four different levels.

14. A packet communication exchanging apparatus as claimed in claim 10, wherein said transmission controlling unit includes a comparator.

15. A packet communication exchanging apparatus as claimed in claim 9, wherein said packet contention on said data bus is caused by both data packets and a dummy packet.

16. A packet communication exchanging apparatus as claimed in claim 9, wherein said packet contention on said data bus is caused by a plurality of dummy packets only.

17. A packet communication exchanging apparatus comprising:

a data bus through which a plurality of data packets are communicated;

a plurality of terminal interface module means, coupled to said data bus, for receiving data packets and transferring data packets to said data bus;

a plurality of trunk interface means, coupled to said data bus, for temporarily storing data packets sent from said terminal interface module means via said data bus, and for generating and sending a dummy packet to said data bus when an amount of data packets temporarily stored therein exceeds a predetermined threshold value; and a control signal channel, interconnected to both said terminal interface module means and trunk interface module means, for announcing a control information signal from said terminal interface module means to said trunk interface module means whereby said terminal interface module means detects a packet contention occurring on said data bus due to said dummy packet supplied thereto so as to control data packet transmission from said terminal interface module means to said data bus in response to said control information signal.

18. A packet communication exchanging apparatus as claimed in claim 17, wherein said terminal interface module means includes:
   a bus monitor for monitoring said packet contention occurring on said data bus to output a contention result signal;
   a transmission controlling unit for receiving said contention result signal to produce a contention control signal and also a control information signal, said control information signal being sent via said control signal channel to said trunk interface module means; and,
   a packet transmitter for controlling data packet transmission based upon said contention control signal.

19. A packet communication exchanging apparatus as claimed in claim 17, wherein said trunk interface module means includes:
   a buffer memory for temporarily storing data packets sent from said terminal interface module means via said data bus;
   a queue packet monitor unit for monitoring an amount of queue data packets temporarily stored in said buffer memory so as to produce said control information signal when said queue packet amount exceeds said threshold value; and,
   a dummy packet generator and transmitter for generating said dummy packet in response to said control information signal and for transmitting said dummy packet to said data bus.

20. A packet communication exchanging apparatus as claimed in claim 19, wherein said queue packet monitor unit includes;
   a counter for counting a quantity of queue data packets temporarily stored in said buffer memory by receiving a packet reception signal and a packet transmission signal derived from said buffer memory;
   a reference memory for previously storing said threshold value; and,
   a first comparator for comparing said quantity of queue data packets with said threshold value so as to output said contention control signal.

21. A packet communication exchanging apparatus as claimed in claim 17, wherein said threshold value is determined at four different levels.

22. A packet communication exchanging apparatus as claimed in claim 18, wherein said transmission controlling unit includes a comparator.

23. A packet communication exchanging apparatus as claimed in claim 17, wherein said packet contention on said data bus is caused by both data packets and a dummy packet.

24. A packet communication exchanging apparatus as claimed in claim 17, wherein said packet contention on said data bus is caused by a plurality of dummy packets only.

25. A packet communication exchanging apparatus comprising:
   a data bus through which a plurality of data packets are communicated;
   a plurality of terminal interface module means, coupled to said data bus, for receiving data packets in a first buffer and transferring data packets from a second buffer to said data bus; and,
   a plurality of trunk interface module means coupled to said data bus, for temporarily storing data packets sent from said terminal interface module means via said data bus in a third buffer, and for generating a dummy packet, storing said dummy packet in a fourth buffer and sending said dummy packet to said data bus when an amount of data packets temporarily stored therein exceeds a predetermined threshold value, whereby said terminal interface module means detects a packet contention occurring on said data bus due to said dummy packet supplied thereto so as to control data packet transmission from said terminal interface module means to said data bus.

26. A packet communication exchanging apparatus as claimed in claim 25, wherein said terminal interface module means includes:
   a bus monitor for monitoring said packet contention occurring on said bus to output a bus monitoring result signal and also a destination address signal of a data packet on said data bus;
   a transmitter controller for receiving said bus monitoring result signal to produce a contention control signal and a packet fetch control signal;
   a packet transmitter for controlling data packet transmission based upon said contention control signal; and
   a packet receiver for receiving data packets based upon said packet fetch control signal.

27. A packet communication exchanging apparatus as claimed in claim 25, wherein said trunk interface module means includes:
   a buffer memory for temporarily storing data packets sent from said terminal interface module means via said data bus;
   a queue packet monitor unit for monitoring an amount of queue data packets temporarily stored in said buffer memory so as to produce a contention control signal when said queue packet amount exceeds said threshold value; and,
   a dummy packet generator and transmitter for generating said dummy packet in response to said contention control signal and for transmitting said dummy packet to said data bus.

28. A packet communication exchanging apparatus as claimed in claim 27, wherein said queue packet monitor unit includes;
   a counter for counting a quantity of queue data packets temporarily stored in said buffer memory by receiving a packet reception signal and a packet transmission signal derived from said buffer memory;
   a reference memory for previously storing said threshold value; and
   a first comparator for comparing said quantity of queue data packets with said threshold value so as to output said contention control signal.

29. A packet communication exchanging apparatus as claimed in claim 25, wherein said threshold value is determined at four different levels.

30. A packet communication exchanging apparatus as claimed in claim 26, wherein said transmitter controller includes a comparator.

31. A packet communication exchanging apparatus as claimed in claim 25, wherein said packet contention on said data bus is caused by both data packets and a dummy packet.

32. A packet communication exchanging apparatus as claimed in claim 25, wherein said packet contention on said data bus is caused by a plurality of dummy packets only.

* * * * *